No. 895,545. PATENTED AUG. 11, 1908.
E. B. FAHNESTOCK.
CONNECTING DEVICE FOR ELECTRICAL CONDUCTORS.
APPLICATION FILED NOV. 24, 1905.
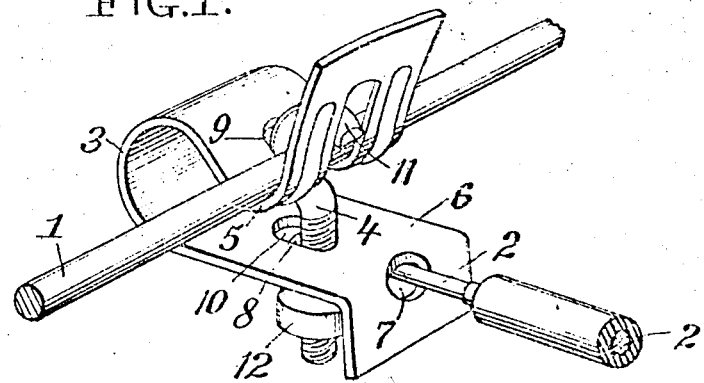
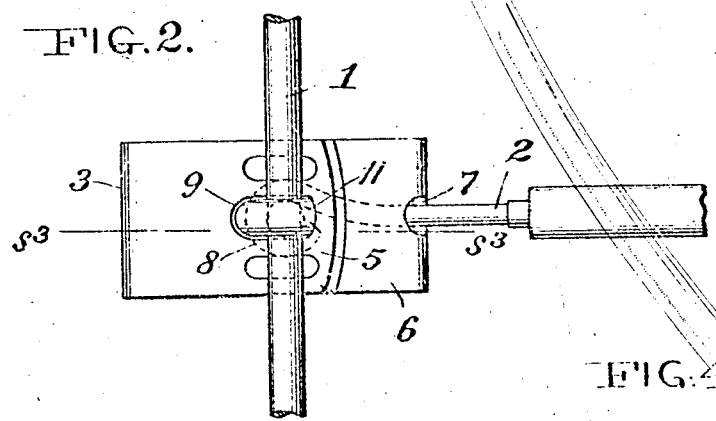
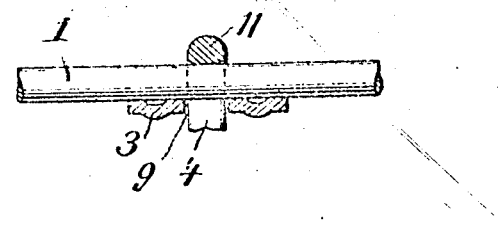
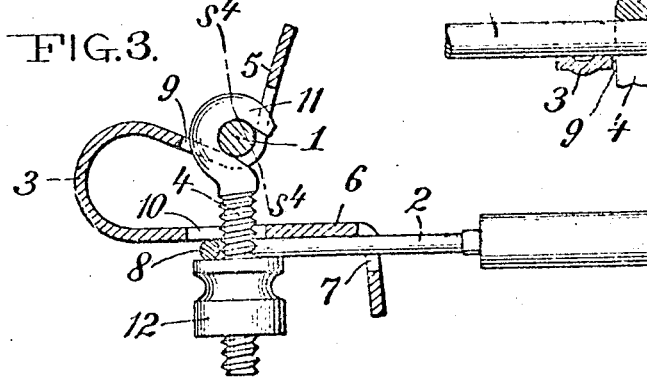
WITNESSES:
Francis O'Connor
W. H. Humphrey
INVENTOR
Ernest B. Fahnestock
BY Geo. H. Benjamin
ATTORNEY

UNITED STATES PATENT OFFICE.

ERNEST BENJAMIN FAHNESTOCK, OF NEW YORK, N. Y.

CONNECTING DEVICE FOR ELECTRICAL CONDUCTORS.

No. 895,545.          Specification of Letters Patent.          Patented Aug. 11, 1908.

Application filed November 24, 1905. Serial No. 288,839.

*To all whom it may concern:*

Be it known that I, ERNEST BENJAMIN FAHNESTOCK, a citizen of the United States, residing at the borough of Manhattan, city, county, and State of New York, have invented certain new and useful Improvements in Connecting Devices for Electrical Conductors, of which the following is a specification.

My invention relates to a device adapted particularly for connecting wires or other electrical conductors and as herein embodied is designed to provide a ready and convenient means of connecting branch circuits, for example, in at any point on a main circuit without cutting, bending, shaping or otherwise disturbing the main line wire or the service over the same.

The accompanying drawings will serve to illustrate a device suitable for carrying my invention into effect.

In the drawings: Figure 1, is a view in perspective showing the device in use. Fig. 2, is a plan view thereof. Fig. 3, is a central vertical section on the line $s^3$, $s^3$, and Fig. 4, is a detail section on the line $s^4$, $s^4$.

Referring now to the drawings: 1 represents a wire, rod, bar, or other electrical conductor, which, for purposes of description, will be hereinafter termed the main circuit or line wire and may serve to carry current for telegraph, telephone, signal, light, or other service.

2 represents one of a series of branch circuit wires such as are usually connected in on the main circuit or line wire 1, and as the latter is ordinarily of continuous length, it is desirable that such connection should be made at any point without interrupting or otherwise disturbing or interfering with service on the main line. For this purpose, I employ a device comprising essentially two members, one a spring 3, and the other a clamp bolt 4.

The spring is interposed between the wires 1 and 2 at the point where the connection is to be made and forms practically a continuation of the branch circuit wire, which if desired, may be soldered thereto, but as will be later on explained, is preferably detachably secured.

The spring shown is approximately C-shaped, but may be given any other form desired. One end 5, of the spring extends under the line wire 1, and is then bent upward forming a V-seat, in which the wire rests. The opposite end 6 thereof projects outward horizontally or substantially parallel with the branch circuit wire 2, and terminates in a downward bent extremity having an aperture 7, formed therein. The wire 2, extends through the aperture 7 and is bent up to form a terminal loop or eye 8 in line with registering apertures 9 and 10 in the spring.

Thus arranged, the parts are secured by the clamp bolt 4, the head of which is in the form of a hook 11, which takes over the line wire 1, and combines with the V-portion of the spring to completely encircle the same, forming in effect, separable clamping members, one acting as a stop to render the pressure exerted by the other effective in making good contact.

The shank of the bolt passes through the apertures 9 and 10 of the spring, also the terminal loop 8 of the wire 2, and its projecting end is threaded as indicated to receive a nut 12, which, when rotated in one direction, compresses the spring, causing it to exert equal pressure in opposite directions upon the wires 1 and 2, the separation of which is limited by the stops, *i. e.*, the hook and nut of the bolt.

The advantages of my invention will be apparent from the foregoing description.

Having thus described my invention, I claim:

1. A fastening device for electrical conductors comprising two opposed and normally separated members, one of said members shaped to form a hook, a third structurally independent member provided with a hook at one end and an adjustable compression device at the other end and adapted to co-act with said opposed members to clamp two electrical conductors.

2. A fastening device for electrical conductors comprising two opposed normally separated members, one of said members bent from without inward to form a hook portion, a third structurally independent hook member provided with a hook at one end arranged in a direction opposed to that of the member having the hook portion, and an adjustable compression device at the other end adapted to co-act with the opposite member whereby two electrical conductors may be clamped into conducting relation.

3. The combination of a continuous line wire, a hook engaging the line wire and terminating in a threaded shank, a branch circuit wire encircling the shank, a spring interposed between the wires, and a nut on the shank for varying the tension of the spring.

4. The combination of a continuous line wire, a branch circuit wire, a spring interposed between the wires and having shaped portions serving as guides therefor, a hook extending through registering openings of the spring and engaging the line wire, and a nut threaded upon the shank of the hook, said nut serving to clamp the branch circuit wire and vary the tension of the spring.

5. A fastening device for electrical conductors comprising a piece of resilient metal looped on itself to form a body member, and a spring member, and having one end bent in a reverse direction to the loop to form with the bend of the loop an angular wire-engaging portion, both said body member and wire engaging portion being provided with apertures, and a resistant member in the form of a clamp bolt adapted to extend through said apertures, whereby when the spring member is forced toward the clamp bolt a conductor may be inserted between the bolt and the wire-engaging portion and be firmly gripped in position by the retractive force of the spring.

6. A fastening device for electrical conductors comprising a piece of resilient metal having normally separated opposing free-ended slotted members, and a clamp bolt adapted to extend through said slots, whereby when the members are forced together, a conductor may be inserted between coacting portions of the clamp bolt and one slotted member and be firmly gripped by the retractive force of said slotted member.

7. A fastening device for electrical conductors, comprising a clamp bolt provided with a wire or conductor receiving portion, and a spring clamping member adjustably connected to said bolt and adapted to coöperate with the wire receiving portion thereof for clamping said wire or conductor, one free end of said spring member forming a finger piece.

8. A fastening device for electrical conductors, comprising slotted free ended body and spring members, and a separate and independent resistant member passing through said slots and coöperating with the spring member to clamp a conductor.

In testimony whereof, I affix my signature, in the presence of two witnesses.

ERNEST BENJAMIN FAHNESTOCK.

Witnesses:
MYRA B. MARTIN,
WILLIAM T. READ.